Aug. 29, 1961     L. B. SLONEKER     2,998,044
PNEUMATIC TIRE
Filed Oct. 6, 1958

INVENTOR.
L. B. SLONEKER
BY Hudson & Young
ATTORNEYS

United States Patent Office 2,998,044
Patented Aug. 29, 1961

2,998,044
PNEUMATIC TIRE
Littleton B. Sloneker, Bartlesville, Okla., assignor to Phillips Petroleum Company, a corporation of Delaware
Filed Oct. 6, 1958, Ser. No. 765,420
2 Claims. (Cl. 152—349)

This invention relates to a pneumatic tire employing an inner tube. In one aspect it relates to a novel inner tube having an improved valve body.

Pneumatic tires requiring an inner tube generally comprise an outer tire shoe or casing in which is disposed a rubber inner tube, the latter having a valve body which is adapted to pass through the rim of the wheel upon which the tire is affixed. Because of their design, these pneumatic tires have several shortcomings which reduce their useful life and limit their applicability. When the inner tube of these tires is initially inflated within the tire casing, pockets of trapped air between the inner wall of the tire casing and the outer surface of the inner tube must be disposed or these trapped air pockets will give rise to blistering and tend to aggravate operational difficulties. When tires of this type are punctured by foreign bodies, such as a nail, the air within the inner tube escapes through the puncture in the inner tube and migrates in the space between the outer surface of the inner tube and the inner wall of the tire casing, causing all the air to escape in a very fast manner giving rise to a quick flat which may ruin the tire. The air migrates rapidly in the space between the inner tube and tire casing and is released through the valve body opening in the tire rim. Oftentimes the valve body is torn loose from the tube and/or rim causing severe damage to the tire.

Accordingly, an object of this invention is to overcome the aforementioned difficulties by the provision of an improved pneumatic tube for the tire requiring an inner tube. Another object is to provide a pneumatic tire which, should a simple puncture occur, permits only a slow or imperceptible leak while the puncturing object remains in place. Another object is to provide a pneumatic tire the inner tube of which can be inflated without the occurrence of air pockets. Another object is to provide a pneumatic tire so constructed that if a simple puncture occurs air from the inner tube cannot enter the space between the outer surface of the inner tube and the inner wall of the tire casing and cause the subsequent collapse of the inner tube. Another object is to provide a pneumatic tire with a novel valve structure or housing which will insure the escape of air between the inner tube and the tire casing during inflation of the inner tube, and will yet retain a positive air-tight seal at the valve opening in the rim of the wheel after complete inflation without necessitating the use of clamping nuts, washers, packing, etc. A further object is to provide an inner tube having an improved valve body. A still further object is to provide a pneumatic tire for automobiles which tire has the same leak-proof advantages of the tubeless tire, yet will retain the advantages of the pneumatic tire of the inner tube type. Further objects and advantages of this invention will become apparent to those skilled in the art from the following discussion, appended claims, and drawing in which:

Figure 1:
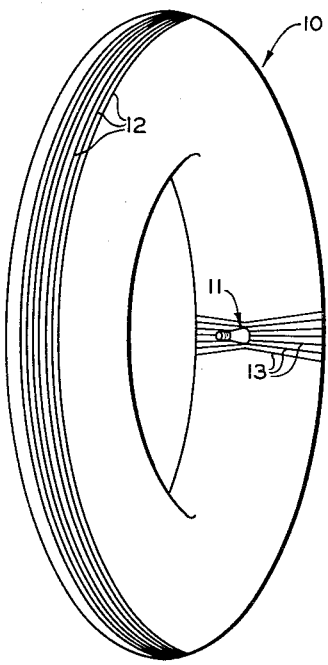
FIGURE 1 is a perspective view of an inner tube constructed according to this invention.

Referring now to the drawing, in which like parts have been designated with like reference numerals, and initially to FIGURE 1, 10 generally designates an inner tube constructed in accordance with this invention. Inner tube 10 is of a circular hollow design and can be fabricated from vulcanized natural rubber or synthetic rubber, such as butyl rubber or GR–S. It is provided with an improved valve structure or body generally designated 11 vulcanizably secured in a conventional manner to its inner periphery or rim area. Inner tube 10 is preferably provided at its crown portion with a plurality of minute (e.g., 0.025 inch) circumferentially arranged parallel spaced ribs or ridges 12 with depressions or channels therebetween and a plurality of similar spaced transverse or encircling ribs 13 which communicate therewith and terminate at the rim area adjacent the valve body 11, thereby permitting the escape of air entrapped between the inner tube and tire casing through the rim opening, as will be explained in detail hereinafter.

Figure 2:
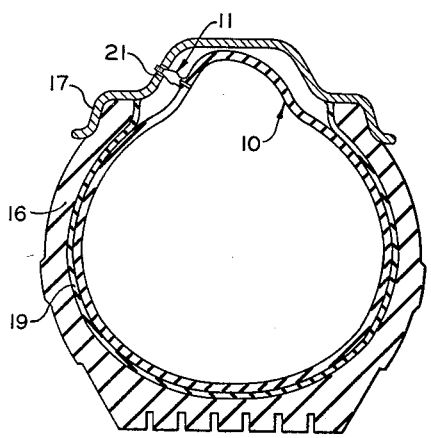
FIGURE 2 is an elevational view in partial section of a pneumatic tire provided with a partially inflated inner tube according to this invention.
Figure 3:
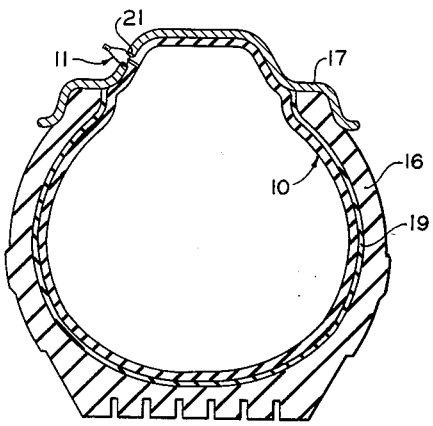
FIGURE 3 is a view similar to FIGURE 2 showing the inner tube of the latter drawing in its completely inflated position.

Referring now to FIGURES 2 and 3, the pneumatic tire of this invention is illustrated, it being provided with a tire shoe or casing 16 and rim 17 of conventional design, such as the drop center type or the like. Disposed within the tire casing cavity is the improved inner tube 10 of this invention, this inner tube being shown in FIGURE 2 in its partially inflated position and in FIGURE 3 in its wholly inflated position. The outer surface of the inner tube 10 is adhesively bonded to the inner wall of the tire casing 16 by any suitable conventional adhesive, shown at 19, the adhesive being of low bonding strength so as to enable the inner tube to be pulled out of the tire casing for repairs. Rim 17 is provided with a valve stem opening 21 through which the valve body 11 of the inner tube 10 is adapted to extend. When the inner tube 10 is in its partially inflated position, or when it is inflated to recommended pressure, as shown in FIGURE 2, the valve body 11 extends through the valve stem opening 21 only partially, the valve body having an intermediate diameter which prevents the valve from freely passing through the valve stem opening, as will be more fully explained hereinafter. In the position shown in FIGURE 2, any air disposed between the outer surface of the inner tube 10 and the inner wall of the tire casing 16 during inflation of the inner tube will be able to freely migrate via the air channels between ribs 12, 13, shown in FIGURE 1, to the valve stem opening 21, as will be more fully explained hereinafter. In its fully inflated or operable position, as shown in FIGURE 3, the inner tube 10 completely contacts at its outer surface the inner wall of the tire casing 16 and it is adhesively bonded thereto. In this position, the valve body 11 fully extends through the valve stem opening 21 in the rim 17 and a positive seal is effected at this opening.

Should a foreign object, such as a nail, puncture the tire casing 16 and the inner tube 10, the complete bond between the inner tube and the tire casing prevents air from passing from the inner tube into the space between the inner tube and tire casing, and, of course, prevents any migration of such air around the outer surface of the inner tube, thereby preventing the collapse of the inner tube and the leakage of air through the valve stem opening 21. The only air which can escape from the inner tube 10 must flow through the opening or juncture made by the foreign object. Ordinarily, such escape of air will be very slow and oftentimes the loss of air will be imperceptible.

Figure 4:
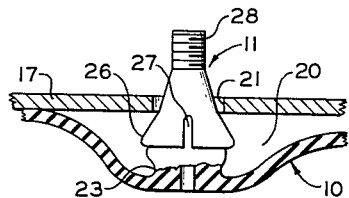
FIGURES 4 and 5 are partial enlarged elevational views of two different embodiments of the valve structure of this invention, the inner tubes being partially inflated.
Figure 4A:
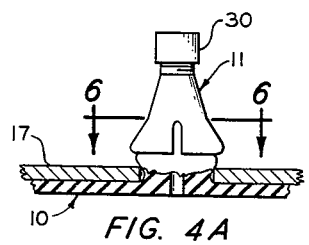
FIGURES 4A and 5A are views similar to FIGURES 4 and 5, respectively, showing the positions of the valve bodies of the latter figures after complete inflation of the inner tubes.
Figures 6, 7, 8:
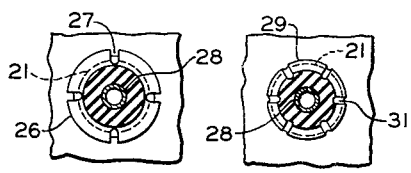
FIGURES 6 and 7 are cross sectional views of FIGURES 4A and 5A, respectively, taken along the planes indicated.
FIGURE 8 is a view of a valve housing pulling tool.

One of the novel embodiments of the valve body of this invention is shown in FIGURES 4, 4A, and 6. In FIGURE 4, the inner tube 10 is in its partially inflated condition or inoperable position and the valve body 11 is shown as only partially extending through the valve stem opening 21 in the rim 17. The valve body 11 is made of rubber or the like and has a generally tapered shape. The valve body 11 is provided with an intermediate annular enlarged portion 26 which is provided with a plurality of longitudinal channels, slots or air vents 27 adapted to permit the escape of air from space 20. The channels 27 can extend beyond either or both sides of the enlarged portion 26. The diameter of the enlarged portion 26 is somewhat larger than the base diameter 23 of the valve body and the valve stem opening 21, this enlarged diameter being slightly exaggerated in the drawing for purposes of illustration. The base 23 of the valve body 11 is preferably in the form of an annular groove 23 which has about the same diameter as the valve stem opening 21. The valve body 11 is provided with the usual metal valve stem 28, the outer extremity of which is provided with external threads and normally closed by a suitable dust cap 30. The complete passage of the valve body 11 through opening 21 is initially prevented by reason of the shoulder formed between the rim defining valve stem opening 21 and the enlarged portion 26. When the tire is substantially completely inflated, it is desirable to affix the pulling tool 25 of FIGURE 8 to the threaded end portion of stem 28 and pull the valve body 11 completely through the opening 21, the valve body then occupying the position shown in FIGURE 4A.

Figure 5:
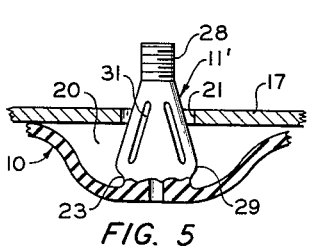
Figure 5A:
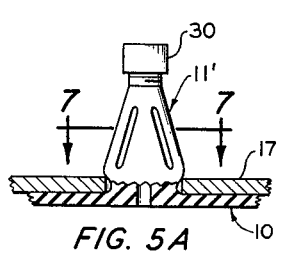

Referring to FIGURE 5, another embodiment of the valve body of this invention is shown and is designated 11'. The valve body 11' is also similarly tapered and has a base portion 23 with a diameter about the same as the diameter of the valve stem opening 21, the base being in the form of a groove as before. The external surface of the valve body 11' is also provided with an enlarged portion 29 having a diameter somewhat larger than that of the base portion 23 and the valve stem opening 21. The external surface of the valve body 11' is also provided with a plurality of longitudinal grooves or air vents 31 which extend outwardly from the enlarged portion 29, these grooves serving to permit the escape of air from the space 20 during inflation of the inner tube 10. When it is desired to fully inflate the inner tube, the pulling tool 25 of FIGURE 8 can be similarly fixed to the threaded end portion of stem 28 and thus by pulling on the pulling tool the valve body 11 can be pulled completely through the valve stem opening 21 so as to occupy the position shown in FIGURE 5A.

The pneumatic tires of this invention can be assembled and inflated in the following manner. The outer surface of the inner tube is coated with a relatively thin layer of adhesive and inserted in the tire casing cavity, the inner wall of which can also be coated with adhesive. Before insertion of the inner tube, it is desirable to first partially inflate the same. The wheel rim is next affixed to the tire casing bead, the valve body of the inner tube partially extending through the small valve stem opening in the rim. Thereafter, the inner tube is inflated, the air trapped between the inner tube and tire casing migrating in the channels on the external ribs on the outer surface of the inner tube and escaping through the valve stem opening via the air vents in the external surface of the valve body. When the inner tube is substantially inflated, the valve body is pulled through the valve stem opening, for example, with the aid of the pulling tool, and the inner tube is then fully inflated to the desired air pressure.

By reason of the enlarged portion of the valve body, an air-tight seal is effected which prevents the escape of air from the pneumatic tire in the event of a puncture. Also, since the inner tube is bonded to the tire casing, migration of air from the inner tube into the space between the inner tube and tire casing is prevented, the external channels on the inner tube being filled with adhesive.

When it is desired to repair the inner tube and/or tire casing, the inner tube can be easily pulled away from the tire casing, the adhesive employed being of low bonding strength.

Pneumatic tires constructed in accordance with this invention have proven their utility by actual use on automobiles driven extended distances on the road. In one case of actual use, these tires were punctured with eight-penny nails and served satisfactorily over 1305 miles of highway, with the nails in place, before any appreciable loss of air was noted. In another case of actual use, these tires were similarly punctured with eight-penny nails and, after 450 miles of service in city driving, exhibited no appreciable air loss.

Various modifications and alterations of this invention will become apparent to those skilled in the art without departing from the scope and spirit of this invention, and the latter should not be unduly limited to the foregoing discussion which illustratively set forth preferred embodiments of this invention.

I claim:

1. In combination with a pneumatic tire casing and a wheel rim having a valve stem opening, a circular hollow inner tube disposed within the cavity of said tire casing, the outer surface of said inner tube being adhesively bonded to the inner wall of said tire casing by a conventional adhesive, said adhesive being of low bonding strength so as to enable said inner tube to be pulled out of said casing for repairs, said inner tube being provided with a rubber generally outwardly tapered valve body secured by vulcanization at its base to the rim area of said inner tube, the external surface of said valve body having an intermediate enlarged annular portion with a diameter slightly larger than that of the base portion of said valve body and slightly larger than that of said valve stem opening, a plurality of circumferentially spaced air vent channels in the external surface of said enlarged portion and extending beyond both sides of the enlarged portion for permitting the escape of air from the space between said casing and said inner tube during inflation of said tube, and an annular groove defined by said enlarged annular portion and the base of said valve body, said annular groove being adapted to effect a pneumatic seal with said valve stem opening when said tube is fully inflated.

2. In combination with a pneumatic tire casing and a wheel rim having a valve stem opening, a circular hollow inner tube disposed within the cavity of said tire casing, the outer surface of said inner tube being adhesively bonded to the inner wall of said tire casing by a conventional adhesive, said adhesive being of low bonding strength so as to enable said inner tube to be pulled out of said casing for repairs, the crown area of said inner tube being provided with a plurality of circumferentially spaced minute ridges defining first channels therebetween, further wherein the external surface of said inner tube is provided with a plurality of spaced transverse encircling minute ridges defining second channels communicating with said first channels and terminating at the rim area adjacent the base portion of the valve body, said inner tube having a rubber generally outwardly tapered valve body secured by vulcanization at its base to the rim area of said inner tube, the external surface of said valve body having an intermediate enlarged annular portion with a diameter slightly larger than that of the base portion of said valve body and slightly larger than that of said valve stem opening, a plurality of circumferentially spaced air vent channels in the external surface of said enlarged portion and extending beyond both sides of the enlarged portion for permitting the escape of air from the space between said tire casing and said inner tube during inflation of said tube, and an annular groove defined by said enlarged annular portion and the base of said valve body, said annular groove being adapted to effect a pneumatic seal with said valve stem opening when said tube is fully inflated.

References Cited in the file of this patent

UNITED STATES PATENTS

| | | |
|---|---|---|
| 2,014,129 | Eger | Sept. 10, 1935 |
| 2,064,695 | Sipe | Dec. 15, 1936 |
| 2,587,470 | Herzegh | Feb. 26, 1952 |
| 2,692,000 | Peterson et al. | Oct. 19, 1954 |
| 2,874,750 | Boyer | Feb. 24, 1959 |